March 9, 1965 A. ZEITLIN 3,172,988
HEATING MATERIAL SUBJECTED TO SUPER HIGH PRESSURE
Filed Nov. 28, 1962
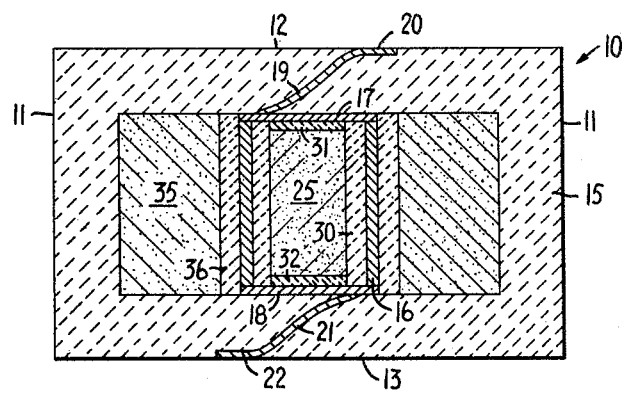
INVENTOR.
ALEXANDER ZEITLIN
BY Brumbaugh, Free,
Graves & Donahue
his ATTORNEYS

United States Patent Office 3,172,988
Patented Mar. 9, 1965

3,172,988
HEATING MATERIAL SUBJECTED TO SUPER HIGH PRESSURE
Alexander Zeitlin, White Plains, N.Y., assignor to Barogenics, Inc., New York, N.Y., a corporation of New York
Filed Nov. 28, 1962, Ser. No. 240,663
5 Claims. (Cl. 219—50)

This invention relates generally to pressure-responsive assemblies which are subjected to super high pressure by pressure-multiplying anvils or other pressure-exerting devices. More particularly, this invention relates to improvements in the provisions in such assemblies for heating material contained therein.

A pressure-responsive assembly of the sort described is typically comprised of an outer casing of pressure-transmissive material such as pyrophyllite, a body within such casing of material to be subjected to high pressure, a heater sleeve surrounding such body and electrical connecting means by which opposite ends of the sleeve are connected to terminals on the exterior of the casing to permit current from an outside source to pass through the casing and sleeve to thereby produce electrothermal heating of the latter. In operation, the assembly is placed between two or more anvils, and the anvils are then actuated to compress the assembly while electric current is simultaneously passed through the sleeve to heat it and to thereby heat the body of material. In this manner, the material to be compressed is subjected at one and the same time both to high pressure and to high temperature.

In prior art pressure-responsive assemblies, it has been customary for all of the mentioned material to be enclosed within the heater sleeve. As a result, the heating of that material by the sleeve has been inefficient because, of the inwardly and outwardly transmitted fractions of the total heat generated by the sleeve, only the inwardly transmitted fraction is fully utilized to heat the material.

It is accordingly an object of this invention to overcome the above noted disadvantages characterizing the heating technique employed in prior art-pressure responsive assemblies.

Another object of the invention is to provide an improved mode of heating material in such assemblies while avoiding the short circuiting of the electrothermal heating element or elements by the material being heated in the instance where the latter is a good conductor of electric current.

These and other objects are realized according to the invention by providing a pressure-responsive assembly wherein the material to be heated is positioned relative to a heating element therefor such that portions of that material are disposed on different sides of the element to receive heat transmitted therefrom in at least two different directions. In this way, more of the total heat generated by the element is effectively utilized in heating the material than if the same were to be disposed only on one side of the element. Particularly is this so since a greater volume of material to be heated is disposed closer to the element. When the material to be heated is a good electrical conductor, short circuiting of the heating element by the material is avoided by interposing a thin layer of highly resistive material between the heating element and each portion of the material which is to be heated by the element.

The heater element may, for example, be in the form of a thin hollow cylindrical sleeve, and the referred-to portions of material may be portions disposed radially inside of and radially outside of the sleeve. Alternatively, however, the heating element may be in the form of a thin plate, strip or ribbon, and the referred-to portions of material to be heated may be portions disposed on translationally opposite sides of the element so as to form a laminar structure therewith. By rendering such structure of an elongated multi-turn shape in accordance with the teachings of U.S. Patent 3,011,043, issued November 28, 1961 in the name of Zeitlin et al., there may be incorporated within a pressure-responsive assembly of limited volume a heater element of which the resistance is increased for the purpose of providing a better impedance match with a conventional source of voltage and current. Evidently, the invention is not limited to one heating element but extends to pressure-responsive assemblies wherein there are a plurality of such elements, and wherein portions of the material to be heated are disposed on opposite sides of each of such elements.

While as noted above, the heater element may be a thin sleeve or a thin strip or plate or have some other shape, preferably the structure of the heater element is one in which two principal heat-emanating surfaces are separated by only a small thickness of the material of which the element is constituted. In this way, the heat-emanating surface area of the element is increased relative to the cross-sectional area thereof (as compared to a heater element of solid circular cross-section) or, to put it conversely, the mentioned cross-sectional area is minimized relative to a given heat emanating surface area per unit length of heater element. To minimize the heat-emanating surface area of the element is desirable because it increases its thermal efficiency as a heater in that, for one thing, a greater volume of "charge" material to be heated can be located nearer to the heat-emanating surface area than would be the case for a heater element having a solid circular cross-section of equal cross-sectional area. To minimize the cross-sectional area of the element is desirable because it increases the resistance per unit length of element for the purpose of matching the impedance of the element to that of a conventional power source.

For a better understanding of the invention, reference is made to the following description of an exemplary embodiment thereof and to the accompanying drawing in which the single figure illustrates the embodiment by a cross-sectional view taken in a plane through the vertical axis of the embodiment.

In the figure, the reference numeral 10 designates a pressure-responsive assembly which is of circular cross-section in the horizontal plane, and which has a circumferential cylindrical face 11 and planar end faces 12 and 13. The assembly 10 is adapted to be compressed in the well-known "belt" apparatus (not shown) wherein the circumferential face 11 is surrounded by a massive pressure-restraining ring, and wherein a pair of oppositely-disposed pressure-multiplying anvils bear against respective ones of the end faces 12, 13 to compress the assembly.

The assembly 10 is exteriorly comprised of a casing 15 of a pressure-transmissive material which may be pyrophyllite and which is of the type ordinarily used for casings in such assemblies, i.e., is a material characterized by high internal friction and by plasticity at super high pressure.

Within the casing is a heating sleeve 16 constituted of a resistive material resistant to deterioration at high temperature, e.g., graphite, tungsten or tantalum. The opposite ends of sleeve 16 are capped by a pair of electroconductive metallic caps 17 and 18 of which each makes electrical contact with the sleeve. A conductor strip 19 leads from cap 17 through casing 15 to end face 12 at which a flat-lying portion 20 of the strip provides a terminal tab for current. A similar conductor strip 21 connects the cap 18 to a current terminal tab 22 exposed at the end face 13 of the pressure-responsive assembly.

In operation, a source of current (not shown) is connected in circuit with the heating sleeve 16 through the mentioned caps, strips and terminal tabs and through the anvils which operably bear against the end faces 12 and 13 to thereby make electrical contact with the terminal tabs at those faces.

Disposed within the sleeve 16 is a cylindrical portion 25 of a charge of material which is to be simultaneously heated and subjected to super high pressure. The particular character of the charge is not critical to the invention, whereby the portion 25 may be in the form, say, of a loose powder, a coherent mass with mechanical strength or a composite structure in which an outer cylinder contains a particulate mass. In the particular embodiment which is shown, the material of the charge is a good conductor of electric current.

To prevent the inner charge body 25 from short circuiting the sleeve 16, a cylindrical insulating sheath 30 of resistive refractory material is interposed inside the sleeve between that sleeve and the charge body 25. To the same end, layers 31 and 32 of resistive refractory material are interposed inside the metal caps 17 and 18 between those caps and the charge body 25. The construction and electrical characteristics of the sheath 30 and of the end layers 31 and 32 may be in accordance with the teachings of my co-pending application Serial No. 120,820, filed May 10, 1961, now abandoned, for "Reaction Vessels for High Pressure Apparatus" which is incorporated herein by reference.

The cylindrical body 25 constitutes only a portion of the charge in assembly 10. The remainder of the charge is contained within the assembly as an annular body 35 disposed inside the casing 15 but outside the circumference of the sleeve 16. To prevent the charge material in the body 35 from short circuiting the sleeve, a sheath 36 made of resistive refractory material and similar in character to sheath 30 is interposed outside the sleeve 16 between the circumferential surface of that sleeve and the body 35. The sheaths 30 and 36 may be on occasion provided by an oxide coating on the heater element.

In operation, the assembly 10 is compressed as described, by anvils bearing against the end faces 12 and 13 of the assembly. As the anvils press inwardly against these end faces, some of the material in casing 15 is extruded by the applied pressure into gaps which circumferentially surround the anvils (and which permit forward movement of the anvils) to there form gaskets which provide lateral support for the anvils, and which hold in the pressure generated on the main body of the casing. The remainder of the material in the casing becomes plastic to communicate in a hydrostatic manner to the interior of assembly 10 the pressure applied by the anvils.

During the compressing of assembly 10 by the electric anvils, current is passed through the sleeve 16 to heat it to high temperature and to cause it to emanate heat both radially inwards and radially outwards. The inwardly emanated component of that heat is transmitted through the sheath 30 to heat the charge material in the inner cylindrical body 25. At the same time, the outwardly emanated component of the heat generated by sleeve 16 is transmitted through the sheath 36 to heat the charge material in the outer annular body 35. Therefore, the heat emanated by the sleeve in both of its principal directions of emanation is utilized to heat the charge material. It follows that the heating by the sleeve of the mass of charge material takes place in a thermally efficient manner, and that a greater mass of charge material than was hitherto practical to heat can be heated in a pressure-responsive assembly of given size.

The above described embodiments being exemplary only, it will be understood that additions thereto, omissions therefrom and modifications thereof can be made without departing from the spirit of the invention, and that the invention extends to embodiments differing in form and/or detail from that specifically described. For example, the sheaths 30, 36 and the end layers 31, 32 may be omitted in the instance where such omisison does not result in undue short circuiting of the sleeve 16 by the charge material in the bodies 25 and 35. Moreover, the geometric configuration of the assembly 10 may be modified to render it suitable for use in super high pressure apaparatus of other than the "belt" type. Thus, for example, the shape of the assembly may be changed to adapt it for use in tetrahedral or cubic presses of the type disclosed in U.S. Patent 2,968,837, issued on January 24, 1961 in the name of Zeitlin et al. Accordingly, the invention is not to be considered as limited save as is consonant with the recitals of the following claims.

I claim:

1. A pressure-receiving assembly adapted to be compressed by pressure-multiplying anvils, said assembly comprising, an outer casing of pressure-transmissive material, an electrothermal heater element disposed in said casing and constituted of electroconductive materials resistant to deterioration at high temperature, said heater element having two oppositely disposed surfaces from which the principal part of the heat of said element is emanated, means connecting opposite ends of said element to respective current terminals at the outside of said casing, and a mass of charge material contained by said casing and adapted to be heated by said element, said charge material being divided into two portions disposed on the opposite sides of said element defined by said oppositely disposed heat-emanating surfaces to each receive heat from a respective one of said surfaces and said element being accordingly effective in each of its two principal directions of heat emanation to heat said material.

2. An assembly according to claim 1 in which said two heat-emanating surfaces are uniformly spaced from each other in the thickness dimension of said element.

3. An assembly according to claim 1 in which a layer of material of high electrical resistance is interposed between each of said portions of charge material and the near heat-emanating surface of said heater element.

4. An assembly according to claim 1 in which said element is in the form of a thin hollow cylindrical sleeve.

5. A pressure-receiving assembly adapted to be compressed by pressure-multiplying anvils, said assembly comprising, an outer casing of pressure-transmissive material, a tubular electrothermal heating sleeve in said casing, means connecting opposite ends of said sleeve to respective current terminals at the outside of said casing, a first body of charge material disposed inside said sleeve to be heated by heat emanated radially-inwards from said sleeve, and a second body of similar charge material disposed in said casing circumferentially around said sleeve to be heated by heat emanated radially outwards from said sleeve.

References Cited by the Examiner

UNITED STATES PATENTS

| | | | |
|---|---|---|---|
| 2,585,818 | 2/52 | Moravec | 219—50 |
| 2,717,300 | 9/55 | Tyne | 219—50 |
| 3,011,043 | 11/61 | Zeitlin et al. | 219—50 |

RICHARD M. WOOD, *Primary Examiner.*